US008414940B2

(12) United States Patent
Awad (10) Patent No.: US 8,414,940 B2
(45) Date of Patent: Apr. 9, 2013

(54) REDUCTION OF ACRYLAMIDE FORMATION IN COOKED STARCHY FOODS

(75) Inventor: Aziz Chafic Awad, Lansing, MI (US)

(73) Assignee: Urth Tech, LLC, Farmington Hills, MI (US)

( * ) Notice: Subject to any disclaimer, the term of this patent is extended or adjusted under 35 U.S.C. 154(b) by 1491 days.

(21) Appl. No.: 10/679,714

(22) Filed: Oct. 6, 2003

(65) Prior Publication Data

US 2004/0086597 A1    May 6, 2004

Related U.S. Application Data

(60) Provisional application No. 60/424,151, filed on Nov. 6, 2002.

(51) Int. Cl.
*A23L 1/105* (2006.01)
*A21D 8/04* (2006.01)

(52) U.S. Cl. ............... 426/18; 426/49; 426/48; 426/62

(58) Field of Classification Search .................. 426/18, 426/19, 21, 27, 28, 48, 49, 52, 60, 61, 62, 426/549, 331, 618, 653
See application file for complete search history.

(56) References Cited

U.S. PATENT DOCUMENTS

| | | | | |
|---|---|---|---|---|
| 1,676,166 A | * | 7/1928 | Sokolsky | 426/582 |
| 2,299,745 A | * | 10/1942 | Hansen | 426/53 |
| 2,721,802 A | * | 10/1955 | Scalise | 426/578 |
| 2,744,017 A | * | 5/1956 | Baldwin | 426/10 |
| 3,193,390 A | * | 7/1965 | Champagnat et al. | 435/248 |
| 3,391,004 A | * | 7/1968 | Trum | 426/19 |
| 3,425,839 A | * | 2/1969 | Pinnegar | 426/16 |
| 3,615,697 A | * | 10/1971 | Hollenbeck | 426/18 |
| 3,818,109 A | * | 6/1974 | Bechtle | 426/41 |
| 3,833,737 A | * | 9/1974 | Siegel, Jack | 426/18 |
| 3,886,046 A | * | 5/1975 | Young et al. | 435/43 |
| 3,891,771 A | * | 6/1975 | Green et al. | 426/52 |
| 3,891,772 A | * | 6/1975 | Ridgway et al. | 426/60 |
| RE29,773 E | | 9/1978 | Wisdom et al. | |
| 4,120,984 A | * | 10/1978 | Richardson et al. | 426/412 |
| 4,140,801 A | * | 2/1979 | Hilton et al. | 426/60 |
| 4,238,567 A | * | 12/1980 | Staron | 435/252 |
| 4,242,361 A | * | 12/1980 | Christ et al. | 426/49 |
| 4,293,655 A | * | 10/1981 | Christ et al. | 426/49 |
| 4,298,620 A | * | 11/1981 | Hagiwara | 426/44 |
| 4,328,317 A | * | 5/1982 | Prentice et al. | 435/294.1 |
| 4,341,802 A | * | 7/1982 | Hopkins | 426/60 |
| 4,348,417 A | * | 9/1982 | Greup et al. | 426/19 |
| 4,428,967 A | * | 1/1984 | Goering et al. | 426/28 |
| 4,474,883 A | * | 10/1984 | Yamamoto et al. | 435/162 |
| 4,500,548 A | * | 2/1985 | Silva | 426/19 |
| 4,568,643 A | * | 2/1986 | Levy | 435/160 |
| 4,684,614 A | * | 8/1987 | Krovak et al. | 435/295.1 |
| 5,221,617 A | * | 6/1993 | Lynn | 426/20 |
| 5,558,898 A | * | 9/1996 | Sunderland | 426/626 |
| 5,750,165 A | * | 5/1998 | Erway | 426/49 |
| 6,001,409 A | * | 12/1999 | Gimmler et al. | 426/549 |
| 6,475,759 B1 | * | 11/2002 | Carlson et al. | 435/139 |
| 2004/0058054 A1 | * | 3/2004 | Elder et al. | 426/658 |

OTHER PUBLICATIONS

Haard et al.; Fermented Cereals: A Global Perspective. FAO Agricultural Services Bulletin No. 138; Online (1999); ( http://www.fao.org/docrep/x2184e/x2184e00.htm ).*
"Yeast Growth Medium" http://www.bio.net/bionet/mm/yeast/1997-December/007601.html; Dec. 20, 1997.*
Lund, Barbara, M.; Baird-Parker, Tony C/,' Gould, Grahame W. Microbiological Safety and Quality of Food, Volumesn 1-2 (pp. 1761-1780). Springer—Verlag. Online version available at: http://www.knovel.com/knove12/Toc.jsp?BookID=9468,VerticalID=0.*
Slator, Arthur "The Rage of Fermentation by Growing Yeast Cells." Biochem Journal. Mar. 1913; 7(2): 197-203.*
Growth Medium—Wikipedia.*
ATCC Catalogue of Bacteria & Bacteriophages, 18th edition, p. 176 and 415, 1992.*
Yeast Media, Solutions and Stocks, Jan. 17, 1991, http://humgen.wustl.edu/hdk_lab_manual/yeast/yeast11.html.*
Yeast Fermentation, Feb. 22, 1999 http://web.archive.org/web/19990222083203/http://spot.colorado.ed u/~kompala/lab2.html.*
How to Restart a Stuck Fermentation, 1999 http://www.yobrew.co.uk/stuck.php.*
Microbiology and Bacteriology: The world of Microbes http://www.bact.wisc.edu/Microtextbook/index.php?module=Book&func=displayarticle&art_id=95.*
Lactic Acid Bacteria, Apr. 20, 2001 http://web.archive.org/web/20010430203337/http://www.waksmanfoundation.org/labs/mbl/lactic.html.*
"Fermented Fruits and Vegetables, A Global Perspective." FAO Agricultural Services Bulletins—134, 1998 http://www.fao.org/docrep/x0560e/x0560e10.htm.*
ATCC, Catalogue of Bacteria and Bacteriophages, 1992; pp. 175, 415 and 452.*
Amrein, Thomas M., et al. "Potential of Acrylamide Formation, Sugars, and Free Asparagine in POtatoes: A Comparison of Cultivars and Farming Systems." Journal of Agricultural and Food Chemistry 2003, 51, pp. 5556-5560.*
"YoBrew—How to restart a stuck fermentation", Sep. 25, 2001. http://web.archive.org/web/20011023115240/www.yobrew.co.uk/stuck.htm.*
Mottram, Donald S., et al. "Acrylamide is formed in the Maillard Reaction." Nature, vol. 419, pp. 448-449.*
Lund, Barbara, M.; Baird-Parker, Tony C.; Gould, Grahame W. (2000). Microbiological Safety and Quality of Food, vols. 1-2.. Springer—Verlag., 2000 Online version available at: http://www.knovel.com/web/portal/browse/display?_EXT_KNOVEL_DISPLAY_bookid=946&VerticalID=0.*

(Continued)

*Primary Examiner* — Viren Thakur
(74) *Attorney, Agent, or Firm* — Butzel Long (57) ABSTRACT

A process for preparation of starchy foods prior to cooking to reduce formation of acrylamide is described. The process uses microorganisms to metabolize sugars in the food sufficiently to reduce formation of the acrylamide. The foods include fried and baked starchy foods including potato chips, cereals, breads, tortilla chips, pretzels, crackers and the like.

10 Claims, 6 Drawing Sheets

OTHER PUBLICATIONS

Growth Medium—Wikipedia.org 2007 http://en.wikipedia.org/wiki/Growth_medium.*

Microbiology and Bacteriology: The World of Microbes, 2006 http://web.archive.org/web/20060828020109/http://www.bact.wisc.edu/Microtextbook/index.php?module=Book&func=displayarticle&art_id=95.*

Mottram, Donald S., et al. "Acrylamide is formed in the Maillard Reaction." Nature, vol. 419, pp. 448-449, Oct. 2002.*

Science, 297:27 (2002).

Marshall, Maurice R. Kim, Jeongmok and Wei,Cheng-I, Enzymatic Browning in Fruits, Vegetables and Seafoods, FAO, 2000.

* cited by examiner

Heat 500 ml distilled water to 30°C

↓

Add 0.5 g dry yeast extract

↓

Add 2.5 g active dry yeast (*Saccharomyces cerevisiae*)

OR

Add 2.5 x 10$^{12}$ bacterial cells (*Streptococcus lactis or thermophilus*)

↓

100 g raw and peeled potato slices (1.27 – 1.78 mm thick) washed with water

↓

Adjust temperature to 30°C

↓

Adjust pH to 6 with a neutralizing agent

↓

Incubate at 30°C for 2.5 hr while mixing using a conventional pump to circulate the aqueous medium from bottom to top

↓

Wash the potato slices with water

↓

Fry with corn oil at 180°C for 2.5 min

Heat 500 ml distilled water to 30°C

Add 0.5 g dry yeast extract

Add 2.5 g active dry yeast (*Saccharomyces cerevisiae*)

OR

Add $2.5 \times 10^{12}$ bacterial cells (*Streptococcus lactis* or *thermophilus*)

100 g fabricated potato chip mix with no sugar added

Adjust temperature to 30°C

Adjust pH to 4 with a neutralizing agent

Incubate at 30°C for 2.5 hr while mixing using a regular mixer equipped with an impeller and a shaft Dry and bake at 250°C for 2.5 min in an oven

FIGURE 4

Heat 500 ml distilled water to 30°C

↓

Add 0.5 g dry yeast extract

↓

Add 2.5 g active dry yeast (*Saccharomyces cerevisiae*)

OR

Add 2.5 x $10^{12}$ bacterial cells (*Streptococcus lactis* or *thermophilus*)

↓

100 g processed cereal mix with no sugar added

↓

Adjust temperature to 30°C

↓

Adjust pH to 4 with a neutralizing agent

↓

Incubate at 30°C for 2.5 hr while mixing using a regular mixer equipped with an impeller and a shaft

↓

Dry and bake at 250°C for 2.5 min

FIGURE 5

Heat 500 ml distilled water to 30°C

Add 0.5 g dry yeast extract

Add 2.5 g active dry yeast (*Saccharomyces cerevisiae*)

OR

Add $2.5 \times 10^{12}$ bacterial cells (*Streptococcus lactis* or *thermophilus*)

100 g corn tortilla chip masa

Adjust temperature to 30°C

Adjust pH to 4 with a neutralizing agent

Incubate at 30°C for 2.5 hr while mixing using a regular mixer equipped with an impeller and a shaft Dry and bake at 230°C for 20 sec then fry at 180°C for 2 min

FIGURE 6

REDUCTION OF ACRYLAMIDE FORMATION IN COOKED STARCHY FOODS

CROSS-REFERENCE TO RELATED APPLICATION

This application relies for priority on U.S. Provisional Application 60/424,151, filed Nov. 6, 2002.

BACKGROUND OF THE INVENTION (1) Field of the Invention

This invention relates to a process for the reduction of acrylamide formation in starchy foods when cooked at high temperature, particularly when they are baked or fried. This invention particularly addresses the problem of acrylamide formation in cooked starchy foods, generally baked or fried at temperatures above 120° C., particularly those selected from the group consisting of chips, tortilla chips, pretzels, crackers, backed goods, fried breads, processed cereals, and French fries. The process of this invention uses microbial cell fermentation to reduce acrylamide precursors (comprising mono- and di-saccharides and others) found in starchy foods prior to cooking. In particular, the present invention relates to a method wherein an uncooked starchy food product is treated with fermentative food grade bacteria and/or yeast under controlled pH and temperatures in the presence of growth stimulants comprising yeast extract and neutralizing agents comprising alkali metal hydroxide (Na or K) or food grade acid (citric, lactic, or hydrochloric).

(2) Description of the Prior Art

The use of acid producing bacterial cultures for food fermentations is well known. In general, the foods are preserved and a flavor is imparted to the food by the acid. The cultures are used for cheese, sausage, cottage cheese, yogurt and the like. Lactic acid is a primary metabolic product and is derived from sugars in the food. The cultures are sold commercially by multiple companies in lyophilized or frozen form. There is less lag time in beginning the fermentation in using the frozen cultures, which are thawed before use, and they are generally preferred. The concentrates usually contain $10^{10}$ to $10^{12}$ CFU per ml or gram of active bacteria.

The use of yeast in food fermentations is also well known. The yeasts are used in baked goods and beer. Generally the cultures are sold in packets which are refrigerated before use in order to preserve the yeasts.

The U.S. Environmental Protection Agency (EPA) classifies acrylamide, a colorless, crystalline solid, as a medium hazard probable human carcinogen. According to the International Agency for Research on Cancer, acrylamide induces gene mutations and has been found in animal tests to cause benign and malignant stomach tumors. It is also known to cause damage to the central and peripheral nervous system. Acrylamide became a source of debate in April 2002, (Science 297 27 (2002)) when Swedish researchers announced that the chemical was present at high levels in starch-based foods that were fried or baked at temperatures higher than 120° C. They found that acrylamide levels in potato chips, French fries, bread and processed cereals are often hundreds of times higher than the maximum level, 0.5 μg per liter, considered safe for drinking water by World Health Organization (WHO) and the U.S.EPA. The highest levels were found in potato chips (a median of 1,200 ppb) and French fries (450 ppb). Subsequent studies in Norway, Switzerland, the U.K., and the U.S. confirmed the results. Meanwhile, the Food and Drug Administration (FDA) and other world health agencies are drafting action plans to assess human dietary exposures to acrylamide, gathering information about its toxicology, and asking the food industry to develop techniques for reducing its formation in food.

The detailed reaction mechanism for the formation of acrylamide involves the reaction of a sugar such as glucose and asparagine. Potatoes in particular contain significant amounts of free asparagine.

Acrylamide was not found in boiled or uncooked starchy foods; therefore, it is a by-product of high-temperature cooking processes. Different cooking times and temperatures could give rise to the variability of acrylamide levels in foods. Frying foods such as French fries or chips at low temperatures (less than 120° C.) might reduce the formation of acrylamide, but this is very detrimental to the texture and flavor. Frying foods at regular frying temperatures (176-190° C.) for a very short period of time might reduce the formation of acrylamide, but these conditions are also very detrimental to the flavor and texture. Moreover, all food must be cooked properly to destroy food poisoning bacteria. Therefore, the prior art has recognized the need for methods to reduce the formation of acrylamide in cooked starch foods that are safe and not detrimental to the flavor and texture.

Objects

It is an object of the present invention to provide a method for the reduction of acrylamide formation in cooked starchy foods without altering their regular cooking process parameters (temperature and time). Further, it is an object of the present invention to reduce acrylamide precursors found in starchy foods prior to cooking using microbial cell fermentation. Further still, it is an object of the present invention to provide methods that are inexpensive to perform, which preserve the flavor and texture of the cooked starchy food and which can be easily scaled-up to large volumes using conventionally available equipment. These and other objects will become increasingly apparent by reference to the following discussion and drawings.

SUMMARY OF THE INVENTION

The present invention relates to a process for reducing acrylamide production in a cooked, starch based processed food which comprises: fermenting the processed food before cooking in an agitated aqueous medium with a microorganism used for food fermentations so as to ferment sugars in the food sufficiently to reduce the acrylamide production upon cooking; and cooking the food, wherein the fermented and cooked food contains less acrylamide than without the fermentations. The aqueous medium can comprise an added sugar. The aqueous medium can also comprise an added amino acid source.

Preferably the aqueous medium is at a temperature between about 10 and 40° C. Preferably the pH of the aqueous medium is between 4 and 8 during the fermentation.

The food can be fried or baked. Preferably the food is selected from the group consisting of potato chips, tortilla chips, pretzels, crackers, baked goods, fried breads, processed cereals and French fries. For French fries and potato chips the aqueous medium is in a reaction vessel and the aqueous medium is recirculated into and out of the vessel while retaining the food in the vessel.

The microorganism is a yeast or a bacterium which is food grade. Mixtures of the microorganisms can be used such as a yeast and a bacterium. Preferably the microorganism is a lactic acid producing microorganism. The microorganisms can be recycled between batches of the food which are processed. Preferably prior to fermenting, a pH of the aqueous medium is adjusted to reduce the acrylamide production. Preferably the food, such as French fries, is washed with water prior to the cooking to remove residues of the fermentation. Preferably at the end of the fermenting the aqueous medium has a pH between about 4 and 5. After the fermenting the food can be dried to remove moisture. This is important with meals such as tortilla chips, cereal and cornmeals.

Thus the present invention relates to a process for the reduction of acrylamide formation in starchy foods cooked at high temperature by removing the acrylamide precursors present in these foods prior to cooking. This process renders acrylamide precursors unavailable (non-reactants) to the acrylamide synthesis reaction that occurs at high temperature (>120° C.) and it is based on using microbial cell fermentation. The process comprises the steps of reacting a mixture of uncooked starchy foods with distilled water (or other purified water) containing yeast extract and/or food grade bacteria, such as lactic acid bacteria and others. The bacteria can be selected from the genera consisting of, but not limited to, Streptococcus spp., Aerobacter spp. Escherichia spp, Leuconostoc spp. The food grade yeast can be selected from the genera consisting of, but not limited to, Saccharomyces sp., Torulopsis spp., Candida spp. and mixtures thereof at optimum pH and temperature with mixing as long as required in order to achieve the highest reduction of acrylamide in these foods when cooked at high temperature.

DESCRIPTION OF PREFERRED EMBODIMENTS

The method for removal of acrylamide precursors in starchy foods prior to cooking largely prevents the formation of acrylamide in these foods when cooked at high temperatures.

Figure 1:
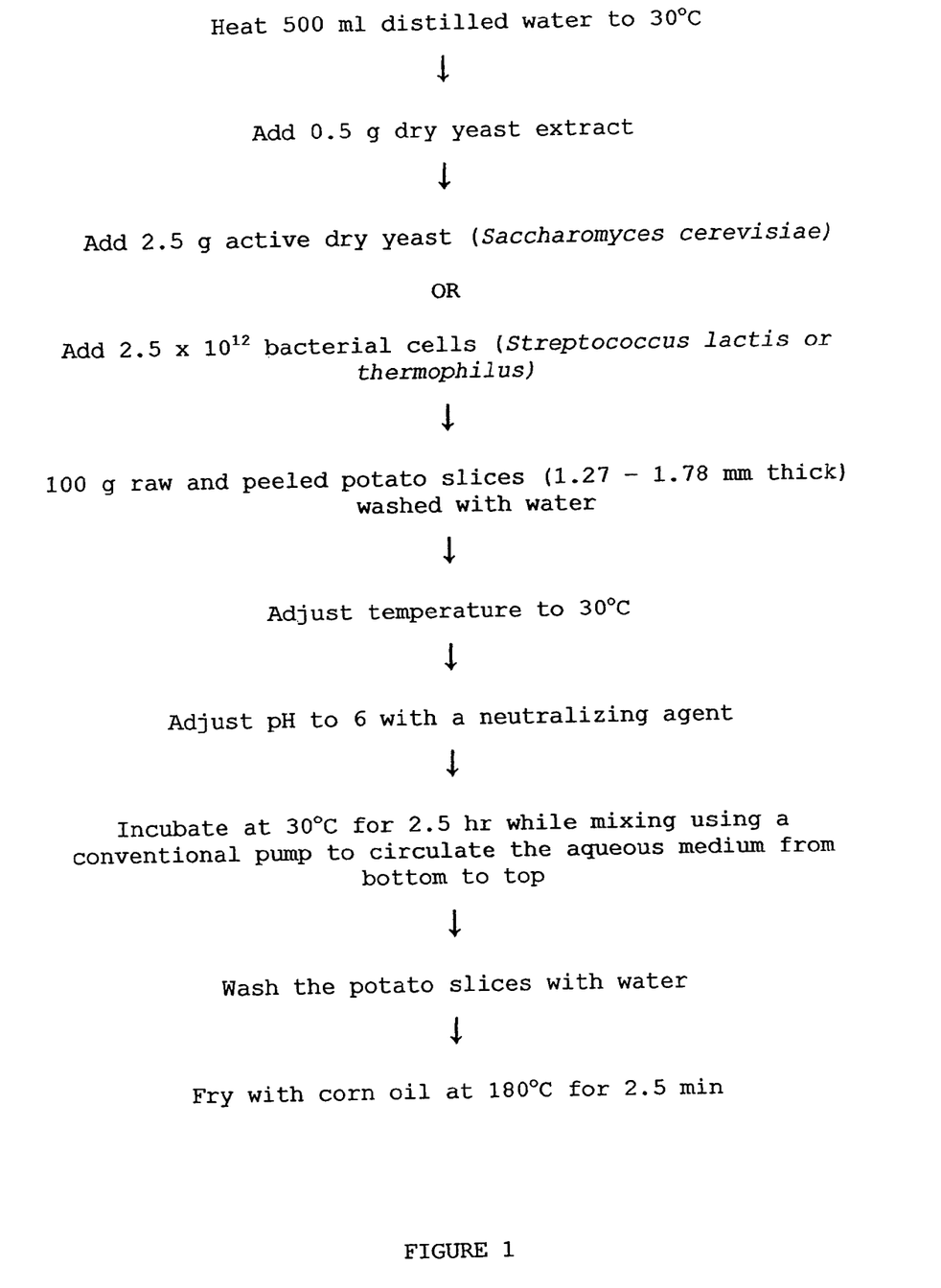
FIG. 1 is a flow diagram showing a preferred microbial fermentation process for the removal of acrylamide precursors in raw potato slices prior to cooking. The process particularly includes reacting 500 ml distilled water containing 0.5 g dry yeast extract and 2.5 g active dry yeast (Saccharomyces cerevisiae) or $2.5 \times 10^{12}$ bacterial cells (Streptococcus lactis or thermophilus) with 100 g raw potato slices for 2.5 hr at pH 6 and temperature 30° C.
Figure 2:
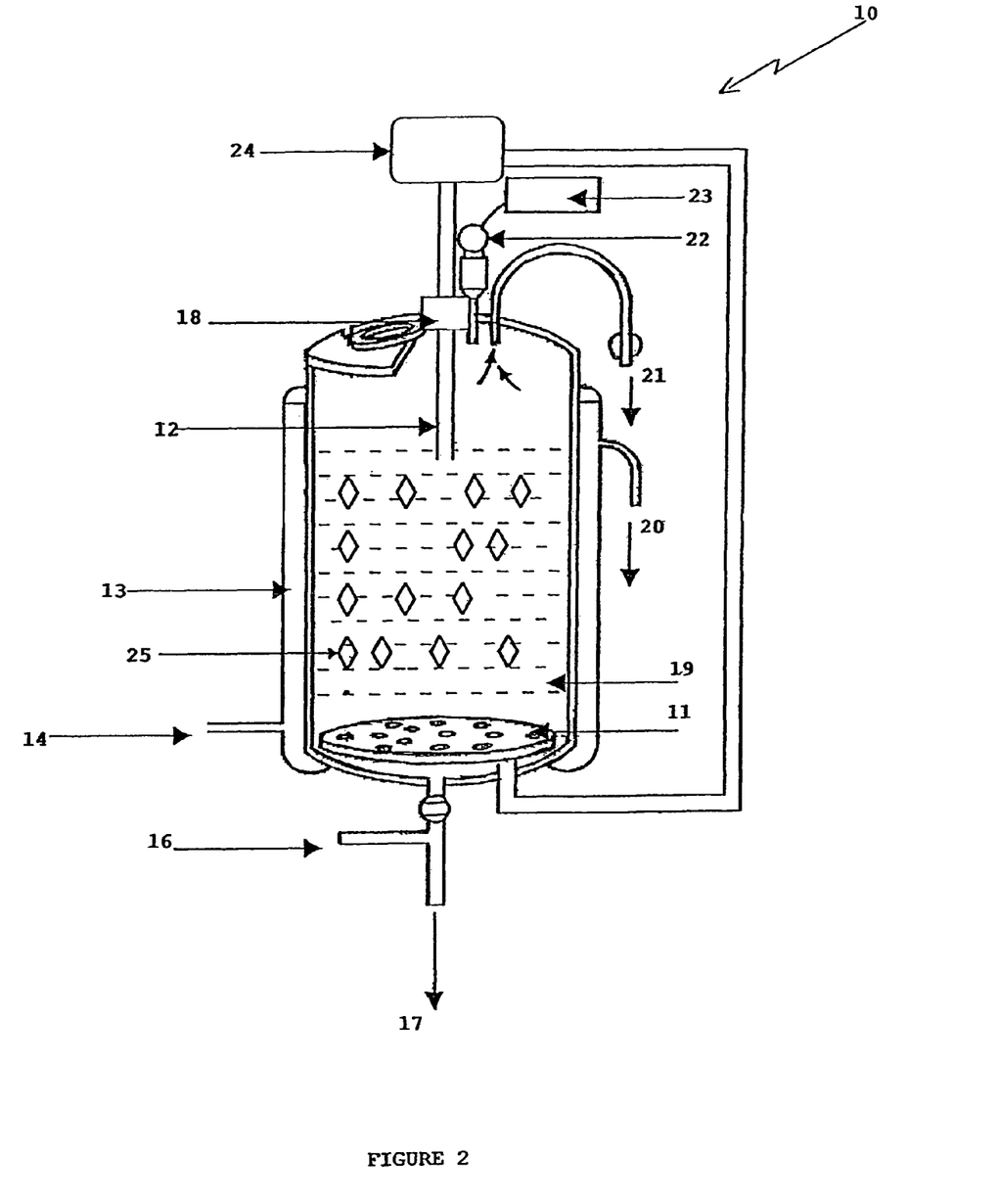
FIG. 2 is a schematic cross-sectional view of a fermenter 10 equipped with a mixing pump (not shown) illustrating the construction and facilities for control.

A preferred process for removal of acrylamide precursors in raw potato slices used to make potato chips is outlined in FIG. 1 using the fermenter illustrated in FIG. 2. The fermenter 10 includes strainer 11, aqueous solution inlet 12, cooling water jacket 13, cooling water inlet 14, steam inlet 16, harvest for condensed steam 16, aqueous solution outlet 17, sterile sealer 18, aqueous medium 19, cooling water outlet 20, exhaust 21, neutralizing agent reservoir 22, pH-meter 23, conventional pump 24, and potato slices 25. The process uses microbial cells consisting of Saccharomyces cerevisiae or Streptococcus lactis (also called Lactococcus lactis) or Streptococcus thermophilus.

Materials and Methods:

Potato tubers, an experimental variety "Wisconsin 123", were obtained from The Michigan Potato Industry Commission. The sugar profile and free amino acids contents are reported in Table 1.

The sugar profile was analyzed using the Official Methods of Analysis of AOAC INTERNATIONAL (2000) 17th Ed., AOAC INTERNATIONAL, Gaithersburg, Md., USA, Official Method 982.14. (Modified).

The free amino acids were analyzed using AOAC International, 982.30 'Protein Efficiency Ratio' (modified), Official Methods of Analysis, (ed.) Patricia Cunniff, Sixteenth Ed., Vol. 2, AOAC International: Arlington, Va. (1995).

Acrylamide was analyzed by Liquid Chromatography-Mass Spectrograph (LCMS), United States Food and Drug Administration, Center for Food Safety and Applied Nutrition Office of Plant and Dairy Foods and Beverages, "Detection and Quantitation of Acrylamide in Foods" (2002).

TABLE 1

Sugar Profile and Free Amino Acids Contents of the Raw and Peeled Potatoes* Used in This Invention

| | Gram/100 grams |
|---|---|
| Sugar Profile | |
| Fructose by HPLC | <0.1 |
| Glucose by HPLC | <0.1 |
| Sucrose by HPLC | <0.1 |
| Maltose by HPLC | <0.1 |
| Lactose by HPLC | <0.1 |
| Free Amino Acids | |
| Aspartic Acid | 0.021 |
| Glutamic Acid | 0.063 |
| Proline | 0.015 |
| Glycine | 0.004 |
| Alanine | 0.027 |
| Cystine | <0.001 |
| Valine | 0.031 |
| Methionine | 0.014 |
| Isoleucine | 0.012 |
| Leucine | 0.011 |
| Tyrosine | 0.024 |
| Phenylalanine | 0.017 |
| Histidine | 0.023 |
| Lysine | 0.025 |
| Arginine | 0.142 |
| Asparagine | 0.411 |

*Experimental variety: "Wisconsin 123"

The potatoes had a significant asparagine content.

Example 1

A fermentation medium was prepared consisting of 500 ml distilled water heated to 30° C. and 0.5 g dry yeast extract.

The 2.5 g active dry yeast (*Saccharomyces cerevisiae*) or 2.5×10$^{12}$ bacterial cells (*Streptococcus lactis* or *thermophilus*) were added. A conventional pump was used with the fermenter which circulated the aqueous fermentation medium into and out of the mixing tank in a loop form to maintain a uniform medium. The washed raw potato slices (100 g) were added in a very quick succession. The aqueous medium was pumped out of the mixing tank through a strainer which prevented the potato slices from going through the pump to avoid any physical damages to the slices caused by the pump. The pH was adjusted to 6 using a pH-meter and neutralizing agent. The temperature during processing was maintained at 30° C. using steam. The processing time of the mixture was 2.5 hr. The sugars available were reduced by the fermentation as was the acrylamide factor upon frying of the potato slices. Generally the fermentation strives for complete inhibition of acrylamide formation in the fried chips.

Example 2

The effect of varying microbial cell concentrations on the reduction of acrylamide formation in fried potato chips and the removal of acrylamide precursors (mono- and di-saccharides and others) prior to cooking was determined using the experimental conditions outlined in FIGS. 1 and 2, and reported in the following experiments in Tables 2 and 3.

TABLE 2

Effect of active dry yeast (*Saccharomyces cerevisiae*) concentrations

| Yeast (g) | pH | Temp. (° C.) | Yeast Extract (g) | Substrate (g) | Time (hr) | Acrylamide Reduction (%) | Mono & di-saccharides (%) |
|---|---|---|---|---|---|---|---|
| 0.5 | 6 | 30 | 0.5 | 100 | 2.5 | 20 | <0.1 |
| 1.5 | 6 | 30 | 0.5 | 100 | 2.5 | 24 | <0.1 |
| 2.5 | 6 | 30 | 0.5 | 100 | 2.5 | 19 | <0.1 |
| 5 | 6 | 30 | 0.5 | 100 | 2.5 | 21 | <0.1 |
| 10 | 6 | 30 | 0.5 | 100 | 2.5 | 16 | <0.1 |

The data suggest that the medium is saturated with yeast cells at the tested concentrations.

TABLE 3

Effect of bacterial cells (*Streptococcus thermophilus*) concentrations

| Bacterial (count) CFU/ml | pH | Temp. (° C.) | Yeast Extract (g) | Substrate (g) | Time (hr) | Acrylamide* Reduction (%) | Mono & di-saccharides (%) |
|---|---|---|---|---|---|---|---|
| 10 × 10$^8$ | 6 | 30 | 0.5 | 100 | 2.5 | 40 | <0.1 |
| 30 × 10$^8$ | 6 | 30 | 0.5 | 100 | 2.5 | 51 | <0.1 |
| 50 × 10$^8$ | 6 | 30 | 0.5 | 100 | 2.5 | 68 | <0.1 |
| 10 × 10$^9$ | 6 | 30 | 0.5 | 100 | 2.5 | 70 | <0.1 |
| 20 × 10$^9$ | 6 | 30 | 0.5 | 100 | 2.5 | 62 | <0.1 |

*In the aqueous medium the data shows greater acrylamide reduction with a higher concentration of the bacteria.

Example 3

Temperature is a factor in a fermentation reaction due to its ability to: (1) change the rate of the reaction, and (2) inactivate the microbial cells. The effect of the reaction temperature on reduction of acrylamide formation in fried potato chips and the removal of acrylamide precursors (mono- and di-saccharides and others) prior to cooking was determined according to the experimental conditions outlined in FIGS. 1 and 2, and reported in the following experiments in Tables 4 and 5.

TABLE 4

Effect of incubation temperature using active dry yeast (*Saccharomyces cerevisiae*)

| Yeast (g) | pH | Temp. (° C.) | Yeast Extract (g) | Substrate (g) | Time (hr) | Acrylamide Reduction* (%) | Mono & di-saccharides (%) |
|---|---|---|---|---|---|---|---|
| 2.5 | 6 | 25 | 0.5 | 100 | 2.5 | 21 | <0.1 |
| 2.5 | 6 | 30 | 0.5 | 100 | 2.5 | 27 | <0.1 |
| 2.5 | 6 | 35 | 0.5 | 100 | 2.5 | 25 | <0.1 |

*The temperature did not change the acrylamide reduction.

TABLE 5

Effect of incubation temperature using bacterial cells
(*Streptococcus thermophilus*)

| Bacterial (count) CFU/ml | pH | Temp. (° C.) | Yeast Extract (g) | Substrate (g) | Time (hr) | Acrylamide Reduction* (%) | Mono & di-saccharides (%) |
|---|---|---|---|---|---|---|---|
| $5 \times 10^9$ | 6 | 25 | 0.5 | 100 | 2.5 | 51 | <0.1 |
| $5 \times 10^9$ | 6 | 30 | 0.5 | 100 | 2.5 | 59 | <0.1 |
| $5 \times 10^9$ | 6 | 35 | 0.5 | 100 | 2.5 | 63 | <0.1 |

*The high temperature increased the acrylamide reduction.

Example 4

The fermentation process can be continued as long as required in order to achieve the highest reduction of acrylamide formation in fried chips. The time involved in the reaction is dependent upon the level of microbial cells used. Microbial cell levels compatible with good economic processing, involve shorter processing times. The effect of incubating time on reduction of acrylamide formation in fried potato chips and the removal of acrylamide precursors (mono- and di-saccharides and others) prior to cooking was determined according to the experimental conditions outlined in FIGS. 1 and 2, and reported in the following experiments in Tables 6 and 7.

TABLE 6

Effect of incubation time using active dry yeast
(*Saccharomyces cerevisiae*)

| Yeast (g) | pH | Temp. (° C.) | Yeast Extract (g) | Substrate (g) | Time (hr) | Acrylamide Reduction* (%) | Mono & di-saccharides (%) |
|---|---|---|---|---|---|---|---|
| 2.5 | 6 | 30 | 0.5 | 100 | 0.5 | 4 | <0.1 |
| 2.5 | 6 | 30 | 0.5 | 100 | 1.0 | 10 | <0.1 |
| 2.5 | 6 | 30 | 0.5 | 100 | 2.5 | 21 | <0.1 |
| 2.5 | 6 | 30 | 0.5 | 100 | 4.0 | 28 | <0.1 |
| 2.5 | 6 | 30 | 0.5 | 100 | 6.0 | 22 | <0.1 |

*Longer times increased acrylamide reduction.

TABLE 7

Effect of incubation time using bacterial cells
(*Streptococcus termophilus*)

| Bacterial (count) CFU/ml | pH | Temp. (° C.) | Yeast Extract (g) | Substrate (g) | Time (hr) | Acrylamide Reduction* (%) | Mono & di-saccharides (%) |
|---|---|---|---|---|---|---|---|
| $5 \times 10^9$ | 6 | 30 | 0.5 | 100 | 0.5 | 20 | <0.1 |
| $5 \times 10^9$ | 6 | 30 | 0.5 | 100 | 1.0 | 28 | <0.1 |
| $5 \times 10^9$ | 6 | 30 | 0.5 | 100 | 2.5 | 61 | <0.1 |
| $5 \times 10^9$ | 6 | 30 | 0.5 | 100 | 4.0 | 64 | <0.1 |
| $5 \times 10^9$ | 6 | 30 | 0.5 | 100 | 6.0 | 55 | <0.1 |

*Longer times increased acrylamide reduction

Example 5

The rate of microbial fermentation reactions is directly affected by the pH of the fermentation medium. The effect of different pHs on the reduction of acrylamide formation in fried potato chips and the removal of acrylamide precursors (mono- and di-saccharides and others) prior to cooking was determined according to the experimental conditions outlined in FIGS. 1 and 2, and reported in the following experiments in Tables 8 and 9.

TABLE 8

Effect of pH using active dry yeast
(*Saccharomyces cerevisiae*)

| Yeast (g) | pH | Temp. (° C.) | Yeast Extract (g) | Substrate (g) | Time (hr) | Acrylamide Reduction* (%) | Mono & di-saccharides (%) |
|---|---|---|---|---|---|---|---|
| 2.5 | 4 | 30 | 0.5 | 100 | 2.5 | 74 | <0.1 |
| 2.5 | 5 | 30 | 0.5 | 100 | 2.5 | 60 | <0.1 |
| 2.5 | 6 | 30 | 0.5 | 100 | 2.5 | 23 | <0.1 |
| 2.5 | 7 | 30 | 0.5 | 100 | 2.5 | 20 | <0.1 |
| 2.5 | 8 | 30 | 0.5 | 100 | 2.5 | 25 | <0.1 |

*pH had a marked effect on acrylamide reduction

TABLE 9

Effect of pH using bacterial cells
(*Streptococcus thermophilus*)

| Bacterial (count) | pH | Temp. (° C.) | Yeast Extract (g) | Substrate (g) | Time (hr) | Acrylamide Reduction* (%) | Mono & di-saccharides (%) |
|---|---|---|---|---|---|---|---|
| $5 \times 10^9$ | 4 | 30 | 0.5 | 100 | 2.5 | 81 | <0.1 |
| $5 \times 10^9$ | 5 | 30 | 0.5 | 100 | 2.5 | 72 | <0.1 |
| $5 \times 10^9$ | 6 | 30 | 0.5 | 100 | 2.5 | 64 | <0.1 |
| $5 \times 10^9$ | 7 | 30 | 0.5 | 100 | 2.5 | 45 | <0.1 |
| $5 \times 10^9$ | 8 | 30 | 0.5 | 100 | 2.5 | 31 | <0.1 |

*pH had a marked effect on acrylamide reduction

At pH 4, the observed acrylamide reduction was higher than the ones observed at the optimal pH (6 or 7) for microbial growth. The higher acrylamide reduction at pH 4 indicates that a low pH has effect on the acrylamide reduction along with microbial fermentation.

Example 6

The nature and the physical state of acrylamide precursors (substrate) containing foods have a major effect on the rate of the fermentation reaction. They affect the accessibility of the substrate to the reaction sites in the microbial cells. The effect of different forms of acrylamide precursor containing foods on the reduction of acrylamide formation in these foods when cooked at high temperature and the removal of these precursors (mono- and di-saccharides and others) from these foods prior to cooking was determined according to the experimental conditions outlined in FIGS. 4, 5, and 6 using the fermenter 30 described in FIG. 3 as summarized in the following set of experiments. The fermenter 30 includes mixer 31, impeller 32, cooling water jacket 33, cooling water inlet 34, outlet 35, steam inlet 36, condensed steam harvest 36, cooling water outlet 37, exhaust 38, neutralizing agent reservoir 39, pH-meter 40, sterile seal 41 and reactants 42.

Figure 3:
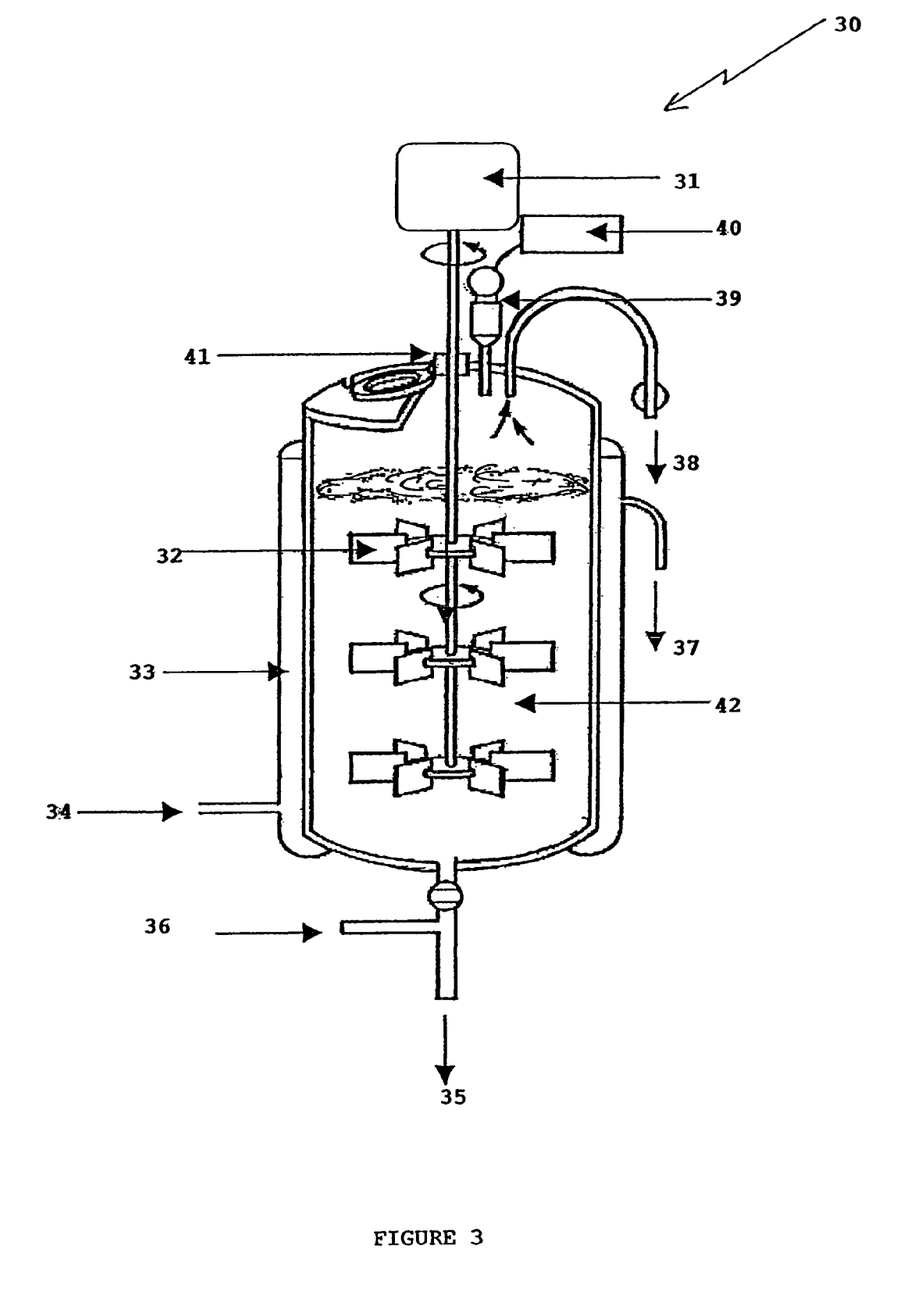
FIG. 3 is a schematic cross-sectional view of a fermenter 30 equipped with a conventional mixer and impeller illustrating the construction and facilities for control.

A fermentation medium was prepared containing 500 ml distilled water which was heated to 30° C. and 0.5 g dry yeast extract. The 2.5 g active dry yeast (*Saccharomyces cerevisiae*) or $2.5 \times 10^{12}$ bacterial cells (*Streptococcus lactis* or *thermophilus*) were added while mixing using a conventional mixer equipped with a shaft and impeller 32 as shown in FIG. 3. The acrylamide precursor containing foods (100 g) were added in a very quick succession. The pH was adjusted to 4 using a pH-meter and neutralizing agent. The temperature during processing was maintained at 30° C. using steam. The processing time of the mixture was 2.5 hr. The results are shown in Table 10.

TABLE 10

Effect of different forms of acrylamide precursors
containing foods using bacterial cells
(*Streptococcus thermophilus*)

| Bacterial (Count) | pH | Temp. (° C.) | Yeast Extract (g) | Foods | Time (hr) | Acrylamide Reduction* (%) | Mono & di-saccharides (%) |
|---|---|---|---|---|---|---|---|
| $5 \times 10^9$ | 4 | 30 | 0.5 | A (FIG. 4) | 2.5 | 81 | — |
| $5 \times 10^9$ | 4 | 30 | 0.5 | B (FIG. 5) | 2.5 | 72 | — |
| $5 \times 10^9$ | 4 | 30 | 0.5 | C (FIG. 6) | 2.5 | 66 | — |

Figure 4:
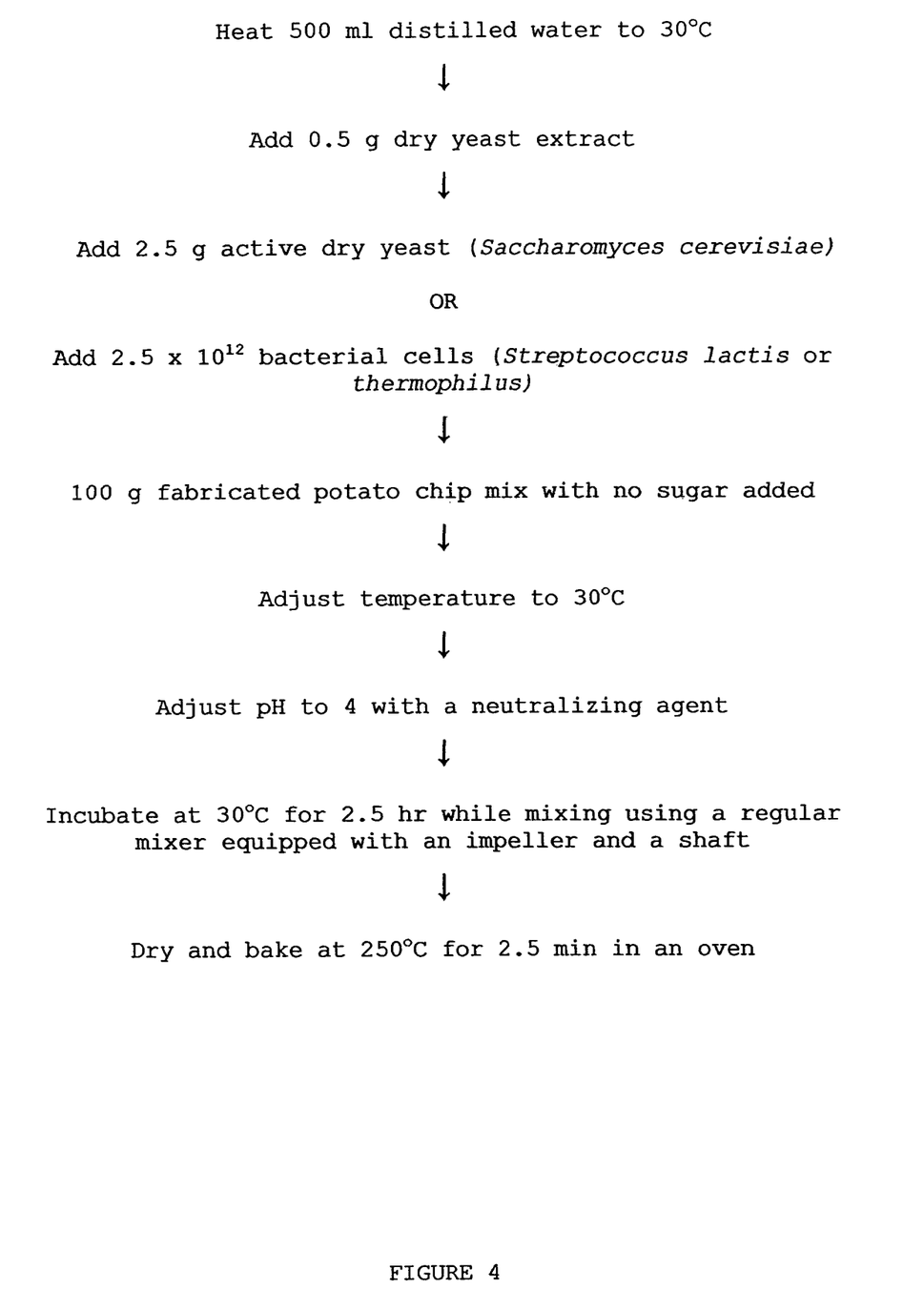
FIG. 4 is a flow diagram showing a microbial fermentation process for the removal of acrylamide precursors in fabricated potato chip mix with no sugar added prior to cooking. The process includes reacting 500 ml distilled water containing 0.5 g dry yeast extract and 2.5 g active dry yeast (Saccharomyces cerevisiae) or $2.5 \times 10^{12}$ bacterial cells (Streptococcus lactis or thermophilus) with 100 g fabricated potato chip mix for 2.5 hr at pH 4 and temperature 30° C.
Figure 5:
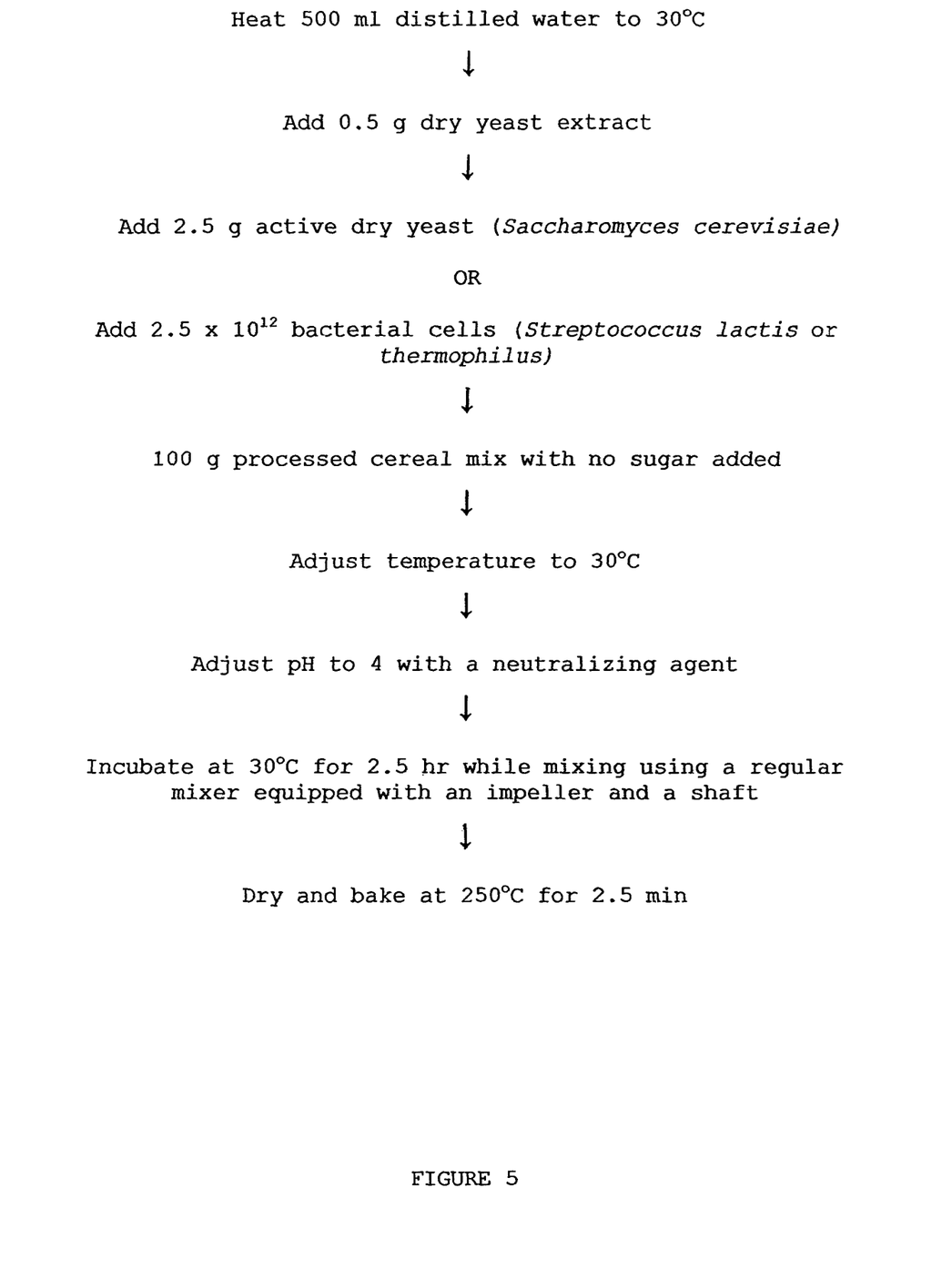
FIG. 5 is a flow diagram showing a microbial fermentation process for the removal of acrylamide precursors in processed cereal mix with no sugar added prior to cooking. The process includes reacting 500 ml distilled water containing 0.5 g dry yeast extract and 2.5 g active dry yeast (Saccharomyces cerevisiae) or $2.5 \times 10^{12}$ bacterial cells (Streptococcus lactis or thermophilus) with 100 g processed cereal mix for 2.5 hr at pH 4 and temperature 30° C.
Figure 6:
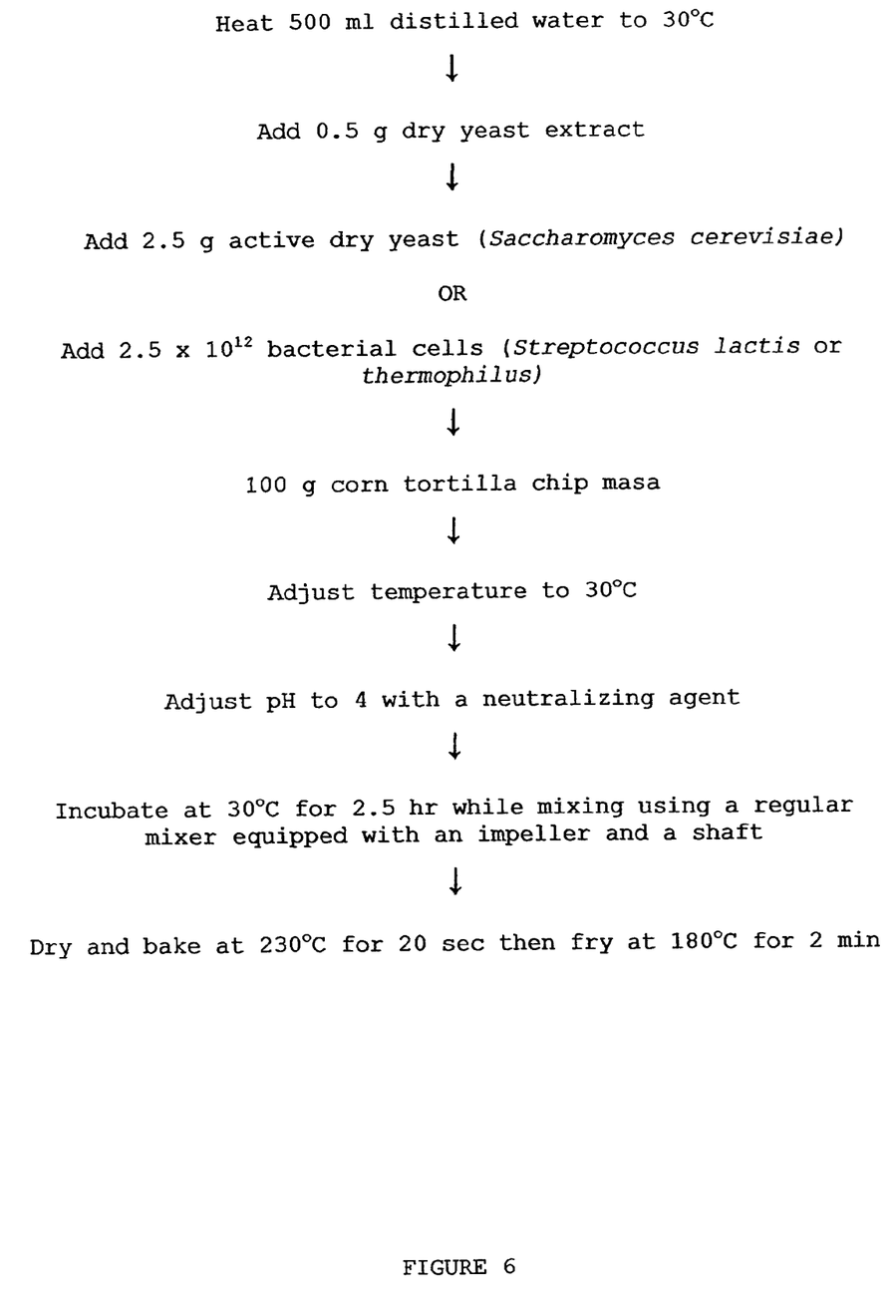
FIG. 6 is a flow diagram showing a microbial fermentation process for the removal of acrylamide precursors in corn tortilla chip masa prior to cooking. The process includes reacting 500 ml distilled water containing 0.5 g dry yeast extract and 2.5 g active dry yeast (Saccharomyces cerevisiae) or $2.5 \times 10^{12}$ bacterial cells (Streptococcus lactis or thermophilus) with 100 g corn tortilla chip masa for 2.5 hr at pH 4 and temperature 30° C.

A: fabricated potato chip mix,
B: processed cereal mix,
C: corn tortilla chip masa.
*There was a significant reduction of acrylamide.

While particular embodiments of the invention is illustrated and described, it will be obvious to those skilled in the art that various changes and modifications can be made without departing from the spirit and scope of this invention.

I claim:

1. A process for reducing acrylamide production from a reaction of free asparagine and sugars in a cooked, starch based processed food, the process comprising:
   (a) adding a raw, uncooked processed food comprising asparagine and sugars to a fermenter with an outlet strainer for straining fermented food, the fermenter containing an aqueous medium having a pH between about 4 and 8, wherein the aqueous medium contains the uncooked processed food and the aqueous medium comprises:
      (i) a microorganism used for food fermentations for metabolizing sugars in the uncooked processed food,
      (ii) yeast extract for fermentation by the microorganism, and
      (iii) a neutralizing agent comprising a food-grade acid or an alkali metal hydroxide;
   (b) agitating the aqueous medium while fermenting the uncooked processed food in the aqueous medium so as to ferment the sugars in the uncooked processed food sufficiently to reduce the acrylamide production upon cooking of the uncooked processed food;
   (c) removing the aqueous medium from the uncooked processed food in the fermenter through the outlet strainer;
   (d) washing the uncooked processed food from step (c); and
   (e) baking or frying the uncooked processed food, thereby forming a fermented and cooked food that contains less acrylamide than without the fermentation;
   wherein no sugars are added to the processed food through steps (a) to (e), and wherein:

(i) the uncooked processed food comprises potatoes, and
(ii) step (e) comprises frying the uncooked processed food without drying the uncooked processed food after step (b) and before step (e).

2. A process for reducing acrylamide production from a reaction of free asparagine and sugars in a cooked, starch based processed food, the process comprising:
(a) adding a raw, uncooked processed food comprising asparagine and sugars to a fermenter with an outlet strainer for straining fermented food, the fermenter containing an aqueous medium having a pH between about 4 and 8, wherein the aqueous medium contains the uncooked processed food and the aqueous medium comprises:
(i) a microorganism used for food fermentations for metabolizing sugars in the uncooked processed food,
(ii) yeast extract for fermentation by the microorganism, and
(iii) a neutralizing agent comprising a food-grade acid or an alkali metal hydroxide;
(b) agitating the aqueous medium while fermenting the uncooked processed food in the aqueous medium so as to ferment the sugars in the uncooked processed food sufficiently to reduce the acrylamide production upon cooking of the uncooked processed food;
(c) removing the aqueous medium from the uncooked processed food in the fermenter through the outlet strainer;
(d) washing the uncooked processed food from step (c); and
(e) baking or frying the uncooked processed food, thereby forming a fermented and cooked food that contains less acrylamide than without the fermentation;
wherein no sugars are added to the processed food through steps (a) to (e), and
wherein the uncooked processed food added in step (a) comprises less than 0.1 wt. % glucose.

3. A process for reducing acrylamide production from a reaction of free asparagine and sugars in a cooked, starch based processed food, the process comprising:
(a) adding a raw, uncooked processed food comprising asparagine and sugars to a fermenter with an outlet strainer for straining fermented food, the fermenter containing an aqueous medium having a pH between about 4 and 8, wherein the aqueous medium contains the uncooked processed food and the aqueous medium comprises:
(i) a microorganism used for food fermentations for metabolizing sugars in the uncooked processed food,
(ii) yeast extract for fermentation by the microorganism, and
(iii) a neutralizing agent comprising a food-grade acid or an alkali metal hydroxide;
(b) agitating the aqueous medium while fermenting the uncooked processed food in the aqueous medium so as to ferment the sugars in the uncooked processed food sufficiently to reduce the acrylamide production upon cooking of the uncooked processed food;
(c) removing the aqueous medium from the uncooked processed food in the fermenter through the outlet strainer;
(d) washing the uncooked processed food from step (c); and
(e) baking or frying the uncooked processed food, thereby forming a fermented and cooked food that contains less acrylamide than without the fermentation;
wherein no sugars are added to the processed food through steps (a) to (e), and
wherein the uncooked processed food added in step (a) comprises less than 0.1 wt. % fructose.

4. A process for reducing acrylamide production from a reaction of free asparagine and sugars in a cooked, starch based processed food, the process comprising:
(a) adding a raw, uncooked processed food comprising asparagine, sugars, and less than 0.1 wt. % fructose to a fermenter containing an aqueous medium having a pH between about 4 and 8, wherein the aqueous medium contains the uncooked processed food and the aqueous medium comprises:
(i) a microorganism used for food fermentations for metabolizing sugars in the uncooked processed food,
(ii) yeast extract for fermentation by the microorganism, and
(iii) a neutralizing agent;
(b) agitating the aqueous medium while fermenting the uncooked processed food in the aqueous medium so as to ferment the sugars in the uncooked processed food sufficiently to reduce the acrylamide production upon cooking of the uncooked processed food; and
(c) baking or frying the uncooked processed food, thereby forming a fermented and cooked food that contains less acrylamide than without the fermentation;
wherein no sugars are added to the processed food through steps (a) to (c).

5. A process for reducing acrylamide production from a reaction of free asparagine and sugars in a cooked, starch based processed food, the process comprising:
(a) adding a raw, uncooked processed food comprising asparagine, sugars, and less than 0.1 wt. % glucose to a fermenter containing an aqueous medium having a pH between about 4 and 8, wherein the aqueous medium contains the uncooked processed food and the aqueous medium comprises:
(i) a microorganism used for food fermentations for metabolizing sugars in the uncooked processed food,
(ii) yeast extract for fermentation by the microorganism, and
(iii) a neutralizing agent;
(b) agitating the aqueous medium while fermenting the uncooked processed food in the aqueous medium so as to ferment the sugars in the uncooked processed food sufficiently to reduce the acrylamide production upon cooking of the uncooked processed food; and
(c) baking or frying the uncooked processed food, thereby forming a fermented and cooked food that contains less acrylamide than without the fermentation;
wherein no sugars are added to the processed food through steps (a) to (c).

6. The process of claim 5 wherein the uncooked processed food added in step (a) comprises less than 0.1 wt. % fructose.

7. The process of claim 5 wherein the uncooked processed food added in step (a) comprises each of fructose, glucose, sucrose, maltose, and lactose at levels less than 0.1 wt. %.

8. The process of claim 5 wherein the fermented and cooked food that contains less acrylamide than without the fermentation has an acrylamide reduction of about 50% or more.

9. The process of claim 5 wherein the fermented and cooked food that contains less acrylamide than without the fermentation has an acrylamide reduction of about 50% to about 80%.

10. The process of claim 5 wherein the fermented and cooked food that contains less acrylamide than without the fermentation has an acrylamide reduction of about 70% to about 80%.

* * * * *